United States Patent [19]

Su et al.

[11] 4,328,191

[45] May 4, 1982

[54] PROCESS FOR THE RECOVERY OF MOLYBDENUM FROM SPENT CATALYSTS

[75] Inventors: Sophia R. Su, Wellesley; Samuel Natansohn, Sharon, both of Mass.

[73] Assignee: GTE Laboratories Incorporated, Waltham, Mass.

[21] Appl. No.: 233,401

[22] Filed: Feb. 13, 1981

Related U.S. Application Data

[63] Continuation-in-part of Ser. No. 149,058, May 12, 1980, abandoned.

[51] Int. Cl.³ .............................................. C01G 39/00
[52] U.S. Cl. ........................................ 423/54; 423/53; 75/101 BE
[58] Field of Search ................... 423/54, 53, DIG. 14, 423/658.5; 75/101 BE

[56] References Cited

U.S. PATENT DOCUMENTS

| | | | |
|---|---|---|---|
| 3,453,068 | 7/1969 | Taue | 423/59 |
| 3,598,519 | 8/1971 | Chiola et al. | 423/54 |
| 3,763,303 | 10/1973 | Khusi et al. | 423/54 |
| 4,046,852 | 9/1977 | Vertes et al. | 423/54 |

FOREIGN PATENT DOCUMENTS

| | | | |
|---|---|---|---|
| 69605 | 5/1969 | German Democratic Rep. | 423/54 |
| 54-9193 | 1/1979 | Japan | 423/54 |
| 7216853 | 12/1971 | Netherlands | 423/53 |

OTHER PUBLICATIONS

Jenkins et al., "J. Appl. Chem.", vol. 14, 1964, pp. 449–454.

*Primary Examiner*—Herbert T. Carter
*Attorney, Agent, or Firm*—Jerry F. Janssen

[57] ABSTRACT

A method of recovering molybdenum from the catalyst residue derived from the process of epoxidizing olefins is disclosed. The catalyst residue, in semi-solid form or as a solution diluted in an organic solvent, is contacted with an aqueous solution of an oxidizing agent such as hydrogen peroxide, nitric acid, or sodium hypochlorite to transfer the molybdenum to the aqueous solution. The molybdenum is thereafter isolated directly from the aqueous solution or, alternatively, from the aqueous solution following preconcentration by liquid-liquid or liquid-solid extraction.

24 Claims, 2 Drawing Figures

PROCESS FOR THE RECOVERY OF MOLYBDENUM FROM SPENT CATALYSTS

CROSS-REFERENCE TO RELATED APPLICATIONS

This application is a continuation-in-part of copending application Ser. No. 149,058 filed May 12, 1980, and now abandoned, in the names of Sophia R. Su and Samuel Natansohn and assigned to the assignee of the present application.

BACKGROUND OF THE INVENTION

This invention relates to the recovery of molybdenum from organic mixtures. More particularly, it is concerned with the recovery of molybdenum from spent catalyst mixtures derived from the epoxidation of olefins.

Molybdenum and its compounds are employed as catalysts in wide variety of industrial scale organic reactions. The value of the metal contained in the spent catalyst residues derived from such processes, considered together with the environmental concerns relating to outright disposal of the molybdenum-containing residues, make the recovery of the metal from these residue mixtures an increasingly important consideration.

One important source of such spent catalyst mixtures which contains appreciable amounts of molybdenum, is the process of epoxidizing olefins employing organic hydroperoxides. This process is disclosed in Belgian Pat. No. 647,076 dated June 20, 1966. The spent catalyst residue from this process contains molybdenum compounds together with a complex mixture of organic compounds, notably low molecular weight alcohols derived from the reduction of the hydroperoxide employed in the expoxidation.

This residue, high in organic content, is an attractive potential fuel, but cannot be burned directly without first removing the molybdenum. Metallic oxides in the combustion effluent pose a serious health and pollution problem when such organic spent catalyst residues containing more than about 100 ppm molybdenum are burned.

Because of the foregoing concerns, a number of processes have been suggested for the recovery of molybdenum from spent organic catalyst residues. Most of these methods entail either the use of water-based solvent extraction systems which are not totally effective in recovering the molybdenum, or require expensive or elaborate processing equipment. One shortcoming of simple extraction processes which employ a water-based extractant is the fact that a major portion of the molybdenum contained in organic spent catalyst residues is organically bound and is not water soluble.

The present invention overcomes the problems and disadvantages of the prior art methods for recovering molybdenum from spent catalyst residues by providing a simple, efficient, and economical method.

SUMMARY OF THE INVENTION

The method of recovering water-insoluble organically-bound molybdenum from spent organic catalyst residues derived from the epoxidation of olefins comprises, in accordance with one aspect of the present invention, the steps of (a) contacting the spent catalyst residue containing organically-bound molybdenum in a lower oxidation state with an aqueous solution containing an oxidizing agent for a period sufficient to oxidize a portion of the molybdenum to a higher oxidation state water soluble form and to transfer a portion of the water soluble molybdenum to the aqueous solution, (b) separating the aqueous molybdenum-containing solution, and (c) then isolating the molybdenum from the aqueous solution.

The oxidizing agent is selected from hydrogen peroxide, nitric acid, sodium peroxide, sodium hypochlorite, chlorine, and ozone.

In one embodiment of the invention the molybdenum-containing organic catalyst residues comprise semi-solid catalyst residues of the type derived from the distillative or evaporative concentration of residues from the epoxidation of olefins, including greater than 5 weight percent molybdenum.

In an alternative embodiment of the invention, the molybdenum-containing organic catalyst residues comprise viscous catalyst residues of the type derived directly from product recovery from the epoxidation of olefins, containing less than 5 weight percent molybdenum. In this embodiment, the residue is diluted with an organic solvent prior to being contacted with an aqueous solution of oxidizing agent.

The molybdenum values are isolated directly from the aqueous solution by evaporation, precipitation, or crystallization, or the aqueous solution may be further concentrated by liquid-liquid extraction or ion exchange liquid-solid extraction prior to isolating the molybdenum.

DETAILED DESCRIPTION

Figure 1:
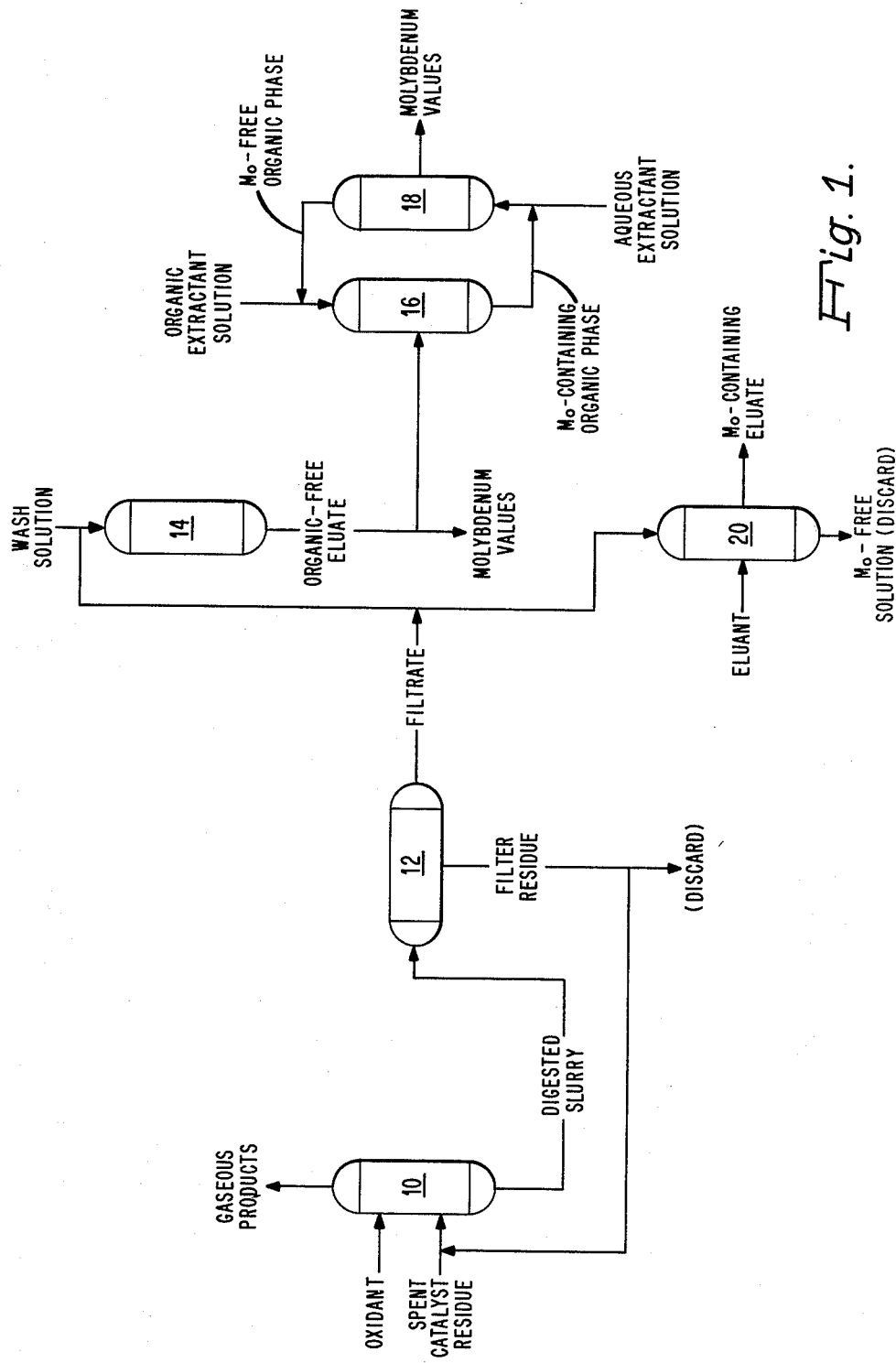
FIG. 1 is a schematic representation of a molybdenum recovery method in accordance with one embodiment of the invention.

The method of the present invention provides an efficient and economical process for recovering molybdenum from spent catalyst residues derived from organic chemical reactions. Particularly, the method of this invention is useful for recovering molybdenum from the spent catalyst residues derived from the epoxidation of olefins. In one such process, for example, propylene is oxidized by the action of tertiary butyl hydroperoxide in the presence of a molybdenum catalyst. In addition to producing propylene oxide, this process also results in tertiary butyl alcohol through reduction of the hydroperoxide.

Following distillative recovery of the desired products of this reaction, the still bottom residues comprise a viscous liquid containing the organomolybdenum compounds and a mixture of organic materials derived from the reaction. The value of the molybdenum contained in these residues, together with problems associated with their disposal has generated interest in the development of processes for extracting the molybdenum.

Many of the processes which have been developed are based on extraction of the still bottom residues with water or an aqueous solution. These methods are often inefficient because they fail to recover all of the molybdenum, a major portion of which is organically bound and thus water insoluble. Moreover, these aqueous extraction methods often extract considerable amounts of low molecular weight water soluble organic components of the still bottom residues along with the desired molybdenum. Additional steps are required to remove these undesired organic components from the aqueous molybdenum extract before further utilization of the molybdenum extract is possible.

It has been found that, according to the method of the present invention, efficient and economical recovery of molybdenum from organic catalyst residues may be accomplished by treating such residues with an aqueous solution of an oxidizing agent to efficiently transfer the molybdenum values from the organic spent catalyst mixture to an aqueous solution. In most cases, the method of this invention results in better than 90% recovery of the molybdenum in a single treatment step.

While holding to no particular theory, it is believed that the method of the present invention differs from prior art methods of extracting molybdenum from spent epoxidation catalyst residues by employing a step of oxidizing the molybdenum contained in the mixture to a higher oxidation state water soluble form and, concomitantly, a portion of the organic content of the mixture. As detailed below in Example LXX, the electron spin resonance (ESR) spectrum of the catalyst residue prior to the oxidation step indicates that a major portion of the molybdenum present in the catalyst residue mixture is in the form of organometallic molybdenum compounds in which the molybdenum is in the 5+ oxidation state. Treatment of this material with an oxidizing solution in accordance with the method of this invention oxidizes the molybdenum to the 6+ oxidation state which releases the molybdenum from the organometallic compounds and renders it water soluble. The transfer of molybdenum from the organic phase to the aqueous phase following this treatment with an oxidant is virtually quantitative, thus allowing for efficient and facile recovery of the molybdenum.

Effective oxidants employed for this treatment step include hydrogen peroxide, nitric acid, aqueous sodium peroxide, aqueous sodium hypochlorite, chlorine, and ozone. In the case of chlorine and ozone, the gaseous oxidant may be added to an intimately mixed slurry of water and the organic catalyst residues. In the instances of hydrogen peroxide, nitric acid, sodium peroxide, and sodium hypochlorite, aqueous solutions of the oxidant may be added to the spent catalyst residues.

Depending upon the specific nature of the spent catalyst residue, the method of the present invention is adapted to effect recovery of the molybdenum. In a first embodiment of the method, shown schematically in FIG. 1, the method is useful for recovering molybdenum from semisolid spent catalyst residues of the type derived, for example, from the distillative or evaporative concentration of residues from the epoxidation of olefins. These still bottom residues generally comprise 5 to 20 weight percent molybdenum with the balance being an indeterminate mixture of higher molecular weight products of the epoxidation process.

In the first step of the process as shown in FIG. 1, the semi-solid molybdenum containing residue is charged to reactor 10 and an oxidant is slowly added with vigorous stirring. In this embodiment, preferred oxidants are a 5-20 weight percent aqueous solution of hydrogen peroxide, with the preferred concentration within this range being about 13.8 weight percent (i.e. 10 volume percent), and concentrated nitric acid, preferably above 5 molar (27 weight percent).

The ratio of oxidant to residue charged to reactor 10 is generally between about 1 and 4 liters of oxidant solution per kilogram of semi-solid residue. The preferred ratio of materials is about 1.5 liters of oxidant solution per kilogram of catalyst residue.

Addition of the aqueous oxidant solution to the still bottom residues causes an exothermic reaction which converts a large fraction of the organic component of the residues to volatile or gaseous products. The heat generated by this reaction may be dissipated by cooling reactor 10 or, alternatively, captured by means of recuperative heat exchangers (not shown) for use elsewhere in the process.

The digested slurry from reactor 10 is passed through filter 12 to remove undissolved solids. The filter residue from filter 12 comprises roughly 20 to 30 weight percent of the original still bottom rsidues and contains less than 1 percent of the molybdenum initially present. The filter residue may be discarded or, alternatively, recycled by combination with an additional batch of residues charged to reactor 10 in order to recover any remaining molybdenum.

The aqueous filtrate from filter 12 is acidic, generally having a pH value of less than pH 2, and contains small amounts of organic contaminants. After adjustment of the pH of this filtrate to a value of above pH 6, it may be passed through sorption column 14 to remove the organic contaminants. The sorption column 14 may be packed with any material effective in removing organic contaminants from an aqueous solution; however, activated charcoal is preferred because of its low cost and efficiency. Engineering considerations such as column head pressure and throughput determine optimum sorption column parameters in any particular application; however, a bed weight and particle size of about 0.33 kilograms of 50–200 mesh activated charcoal per liter of aqueous filtrate solution have been found effective in removing the organic contaminants.

Following sorption of undesirable organics from the filtrate solution, any molybdenum values retained by sorption column 14 may be washed free of the column by means of a water or 1 M ammonium hydroxide wash. The molybdenum values may then be isolated from the combined eluate and wash solution by conventional techniques. The process to this point generally results in recovery of more than 95% of the molybdenum initially present in the still bottom residues charged to reactor 10. The combined eluate and wash solution from column 14 for a typical batch of still bottom residues processed as described above, is a water clear solution containing on the average of 20 g of molybdenum per liter.

If, for a particular application of the process of this invention, the volume of the combined eluate and wash from column 14 is considered too large, the solution of molybdenum values may be concentrated by a series of liquid-liquid extraction steps. In this alternative, the eluate and wash from column 14 is cycled through extractors 16 and 18.

The organic extractant solution charged to extractor 16 is a solution of a tertiary alkylamine or a quaternary alkylammonium salt dissolved in a mixed $\geq C_8$ aromatic hydrocarbon solvent. The solvent may contain additional oxygenated organic compounds such as alcohols. Particularly effective extractants for use in extractor 16 include Alamine 336 and Aliquat 336. Alamine 336 is tricaprylylamine and Aliquat 336 is methyl tricaprylylammonium chloride, both materials available from Minerals Industry Division of Henkel Corporation, 4620 West 77th Street, Minneapolis, Minn. The solvent may be a commercially available hydrocarbon mixture such as SC #150 solvent, a mixture of $\geq C_8$ aromatic hydrocarbons available from Buffalo Solvents and Chemicals Corporation, P.O. Box 73, Station B, Buffalo, N.Y.

The ratio of materials loaded to extractor 16 is generally about 2 volumes of aqueous molybdenum containing solution to 1 volume of 1 M organic extractant solution.

The molybdenum-loaded organic phase from extractor 16 is transferred to extractor 18 where it is extracted with an aqueous extractant solution. If the extractant is an amine such as Alamine 336, the preferred stripping solution of column 18 is 3 M ammonium hydroxide. In the case where the extractant of column 16 is a quaternary alkylammonium salt such as Aliquat 336, the preferred aqueous stripping solution for column 18 is a solution 3 M with respect to both ammonium hydroxide and ammonium chloride. The ratio of loading to column 18 is generally about 2 volumes of organic solution to 1 volume of aqueous. Following the extraction step in column 18, the molybdenum-free organic phase is recycled to column 16, and the molybdenum-loaded aqueous phase is separated from extractor 18 in order to isolate the molybdenum values by known techniques. This final aqueous molybdenum extract generally contains better than four times the concentration of molybdenum present in the aqueous solution initially charged to extractor 16.

In a further alternative of this embodiment of the invention, the aqueous filtrate solution from filter 12 may be passed through ion exchange column 20 in order to collect the molybdenum values on the column. Elution of the column with a lesser volume of eluant results in the collection of the molybdenum values in a more concentrated form. A preferred ion exchange resin for use in column 20 is a copolymer of 8-hydroxyquinoline, resorcinol, formaldehyde, and ethylenediamine such as disclosed in U.S. Pat. No. 4,180,628.

The filtrate from filter 12 is passed through column 20 until analysis of the effluent from the column indicates that sorption of the molybdenum has dropped below about 80%. At this point further addition of the filtrate is stopped and the molybdenum is eluted from the column by means of an aqueous eluant, preferably a solution 1 M with respect to both ammonium hydroxide and ammonium chloride. The molybdenum values may then be isolated from the eluate by known techniques.

The embodiment detailed above is particularly adapted for the recovery of molybdenum from semisolid still bottom residues which contain greater than 5 weight percent molybdenum and a mixture of high molecular weight organic materials. It results in the removal of 70-80 weight percent of the organic components leaving a material with little, if any, caloric value.

Figure 2:
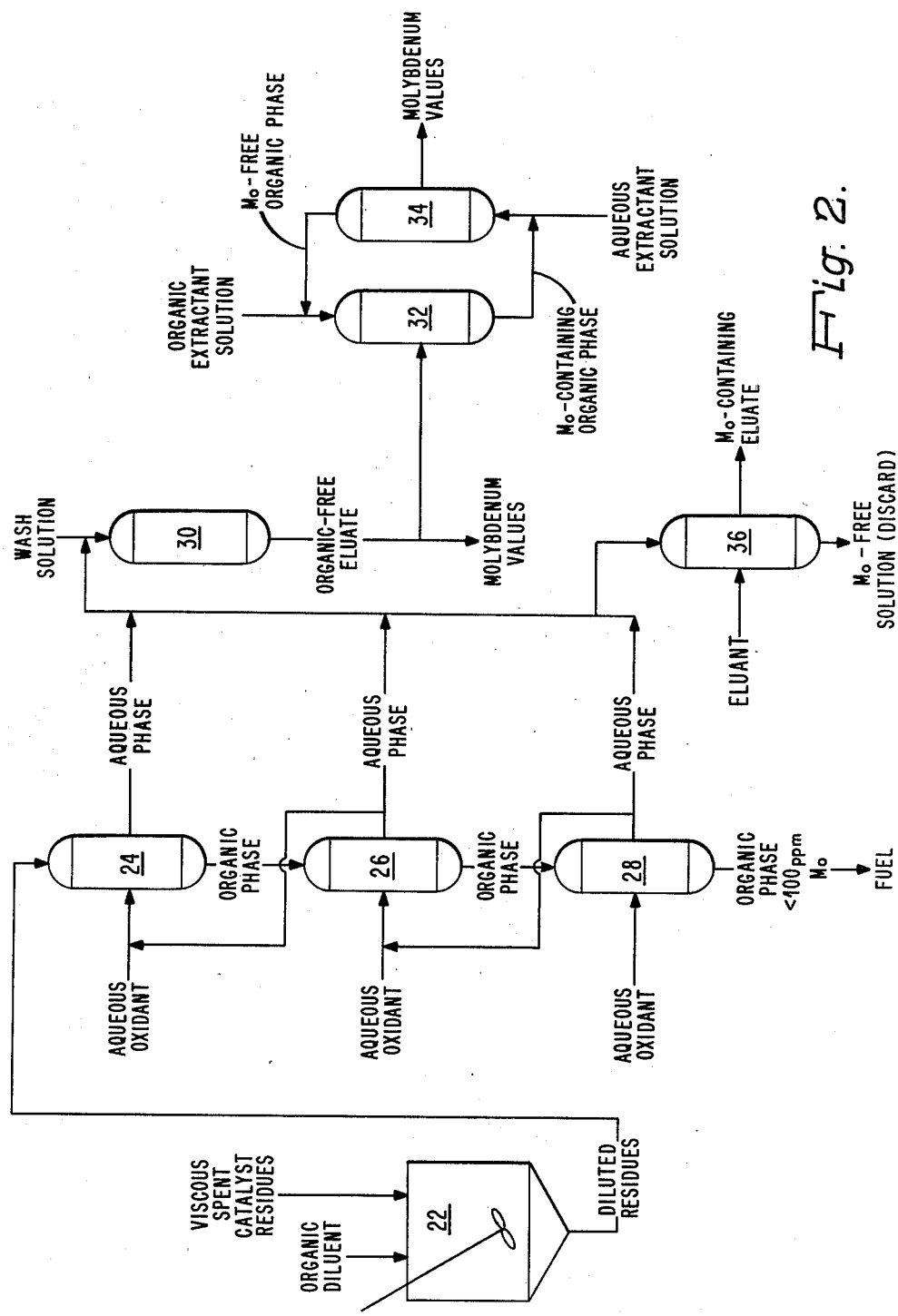
FIG. 2 is a schematic representation of a molybdenum recovery method in accordance with an alternative embodiment of the invention.

A second embodiment of the present invention, shown schematically in FIG. 2, is particularly suited for spent viscous fluid catalyst residues from the epoxidation of olefins, which residues have not been concentrated by distillation or evaporation. These residues generally contain less molybdenum, about 1-5 weight percent, and a larger fraction of lower molecular weight organic compounds. Although somewhat fluid, these residues are often dark viscous materials which are difficult to pour.

The first step of this embodiment of the invention, as shown in FIG. 2, is the dilution of the molybdenum containing organic residue with an organic solvent. The choice of solvent is determined partly by cost and availability, but hydrocarbons such as toluene and xylene, hydrocarbon mixtures such as heating oil, #2 diesel fuel, kerosene, and SC #150, alcohols, esters, and ketones may be used. Specific examples of solvents which have been employed for this purpose are detailed below in the Examples.

The ratio of solvent to still bottom residues is generally about 1 liter of organic diluent per kilogram of residue to 1 liter of organic diluent per 4 kilograms of residue. As shown in FIG. 2, the materials are thoroughly mixed in mixer 22 to obtain a free flowing liquid.

The diluted residues from mixer 22 are then subjected to a number of oxidative treatment steps with aqueous solution of oxidant in reactors 24, 26, and 28. The diluted residue solution is reacted with an oxidant in reactors 24, 26, and 28 and the aqueous phase from the second and subsequent reactors may be recycled to contact the organic phase of preceding steps. Although illustrated as a series of discrete reaction steps in FIG. 2, this treatment may also be carried out in a single countercurrent reactor.

The aqueous oxidant solution is selected from hydrogen peroxide, nitric acid, aqueous sodium peroxide solution, aqueous sodium hypochlorite solution, chlorine, or ozone. Hydrogen peroxide, nitric acid, and aqueous sodium hypochlorite solution are preferred.

If hydrogen peroxide is selected as the aqueous oxidant for use in reactors 24, 26 and 28, a solution which is about 1 to 5 volume percent is employed, preferably about 3 volume percent. The ratio of aqueous oxidant solution to residues is chosen to be about 1 liter of oxidant solution per kilogram of diluted residues.

The number of reaction steps shown in FIG. 2 is three, but may be more or less than this number in order to bring the molybdenum content remaining in the organic phase to a value below about 300 ppm, preferably below about 100 ppm. At this level, the organic phase can be safely employed as a fuel, either directly or by addition to other fuels. This organic residue has the consistency and caloric content roughly equivalent to bunker C oil.

The molybdenum containing aqueous phases from the reactors are next combined and, as shown by the alternative pathways in FIG. 2, may either be concentrated by passage through an ion exchange column 36, or stripped of remaining organic contaminants by passage through sorption column 30.

In one of these alternative pathways, the pH of the combined aqueous phases from reactors 24, 26, and 28 is adjusted to a value above about pH 6. The solution is then passed through sorption column 30. As detailed above in the first embodiment, the sorption column 30 is preferably packed with 50-200 mesh activated charcoal.

The sorption column is then washed free of any molybdenum retained on the column by means of a water or 3 M ammonium hydroxide wash. The combined eluate and wash from column 30 may then be treated by known techniques such as evaporation, precipitation or crystallization to isolate the molybdenum or, alternatively, subjected to liquid-liquid extraction in extractors 32 and 34 to concentrate the solution prior to isolating the molybdenum.

In extractors 32 and 34, the aqueous eluate and wash from column 30 is extracted first with a tertiary alkyl amine or a quaternary alkylammonium salt dissolved in a mixed $\geq C_8$ aromatic hydrocarbon solvent. These materials are preferably Alamine 336, Aliquat 336, and SC #150 solvent as detailed in the first embodiment above.

Alternatively, the aqueous phase from reactors 24, 26, and 28 may be combined and passed through an ion exchange columnn 36. The preferred column is of a copolymer resin of 8-hydroxyquinoline, resorcinol, formaldehyde, and ethylenediamine as set out above. The eluant may be a solution 1 M with respect to both ammonium hydroxide and ammonium chloride. The molybdenum values are recovered from this concentrated eluate by known techniques.

If the aqueous oxidant solution employed in reactors 24, 26, and 28 is sodium hypochlorite, a solution of about 4 to 6 weight percent is preferred. The ratio of loading to the reactors is generally chosen to be about 1 to 3 liters of aqueous hypochlorite solution per kilogram of diluted still bottom residues, preferably about 1.5 liters per kilogram. As set out in the Examples below, treatment of diluted molybdenum containing still bottom residues with aqueous sodium hypochlorite solution often results in a transfer of 99% of the molybdenum to the aqueous phase. If nitric acid is chosen as the oxidant, concentrations above 5 molar (27 weight percent are preferred). As shown below in Table 7, at lower nitric acid concentrations, the efficiency of molybdenum extraction is diminished considerably.

In order to enable one skilled in the art to practice the present invention, the following Examples are provided. These Examples are not to be viewed as limiting the scope of the invention as claimed in the appended claims, but are merely illustrative thereof.

EXAMPLES

EXAMPLE I

To a vigorously stirred mixture of 50.88 of semisolid still bottom residues containing 12.2 weight percent molybdenum were solowly added 153 ml of 13.8 weight percent (10 volume percent) hydrogen peroxide solution. The mixture was stirred for one half hour and then filtered to remove undissolved solids. The aqueous filtrate was found to contain 6.114 g or 98.5% of the molybdenum originally present in the organic catalyst residue mixture. The filter residue was dried overnight and weighed; it weighed 13.94 g, or 27.4% of the original weight of the still bottom residue mixture.

EXAMPLES II–VI

To assess the effect of the ratio of peroxide solution volume to weight of still bottom residues upon the efficiency of molybdenum recovery, varying amounts of still bottom residues containing between 10-11 weight percent molybdenum were digested with 20 ml portions of 13.8 weight percent (10 volume percent) hydrogen peroxide solution. The mixtures were filtered following digestion and the filtrate and filter residue separately analyzed for molybdenum content. The data from these examples appear in Table 1. As indicated there, the efficiency of molybdenum recovery exceeded 99% when the ratio of peroxide solution volume to still bottom residues was at least 2 ml/g.

TABLE 1

| EXAMPLE | WEIGHT OF STILL BOTTOM RESIDUES (g) | VOLUME OF $H_2O_2$ 13.8 w/o (10 v/o) (ml) | RATIO OF $H_2O_2$ VOLUME TO STILL BOTTOM RESIDUE (ml/g) | DISTRIBUTION OF MOLYBDENUM | |
|---|---|---|---|---|---|
| | | | | % IN FILTRATE | % IN FILTER RESIDUE |
| II | 3.00 | 20 | 6.67 | 99.5 | 0.44 |
| III | 6.08 | 20 | 3.28 | 99.1 | 0.82 |
| IV | 9.21 | 20 | 2.17 | 99.4 | 0.52 |
| V | 12.04 | 20 | 1.66 | 98.7 | 1.30 |
| VI | 15.25 | 20 | 1.31 | >87 | |

EXAMPLES VII–X

To assess the effect of the concentration of hydrogen peroxide solution upon the efficiency of molybdenum recovery, 10 g samples of stillbottom residues containing between 11.6 to 11.9 weight percent molybdenum were digested with 25 ml portions of hydrogen peroxide solution of varying strength. The mixtures were filtered following digestion and the filtrate and filter residue separately analyzed for molybdenum content. These data appear in Table 2 and show that effective recovery of molybdenum occurs when the hydrogen peroxide solution concentration is above about 5.7 weight percent (4 volume percent).

TABLE 2

| EXAMPLE | WEIGHT OF STILL BOTTOM RESIDUES (g) | VOLUME OF $H_2O_2$ SOLUTION (ml) | CONCENTRATION OF $H_2O_2$ SOLUTION | | DISTRIBUTION OF MOLYBDENUM | |
|---|---|---|---|---|---|---|
| | | | w/o | (v/o) | % IN FILTRATE | % IN FILTER RESIDUE |
| VII | 9.95 | 25 | 13.8 | (10) | 98.3 | 1.8 |
| VIII | 9.97 | 25 | 11.1 | (8) | 97.6 | 2.4 |
| IX | 10.13 | 25 | 8.4 | (6) | 97.4 | 2.6 |
| X | 10.04 | 25 | 5.7 | (4) | 93.9 | 6.1 |

Examples I-XIII illustrate the application of the first embodiment of this invention wherein semi-solid organic catalyst residues containing greater than 5 weight percent molybdenum are treated to recover the molybdenum values.

EXAMPLE XI

This example illustrates the incorporation into the process of this invention the additional step of clarification of the filtrate solution by contacting it with activated charcoal following the digestion and filtration steps.

A sample of 23.55 g of still bottom residues containing 11.9 weight percent molybdenum was digested with 71 ml of 13.8 weight percent hydrogen peroxide solution. The resulting slurry was filtered and analyzed for molybdenum content. It was found to contain 98.6% of the molybdenum originally present in the still bottom residue mixture. The pH of the filtrate solution was adjusted from pH 1.6 to pH 8 by addition of sufficient 4.5 weight percent aqueous ammonia solution. The mixture was filtered and then slurried for one-half hour with activated charcoal and again filtered. The filter cake was washed with 1 M aqueous ammonia solution. The washings were combined with the filtrate, which was water clear and was found to contain 95% of the molybdenum originally present in the still bottom residues.

EXAMPLE XII

This example illustrates the concentration upgrading of the molybdenum-containing filtrate solution by liquid-liquid extraction following the steps of digestion and filtration.

The filtrate from the hydrogen peroxide digestion and filtration of Example I was contacted with a 1 molar solution of Aliquat 336 dissolved in SC #150 solvent. The ratio of aqueous filtrate solution to organic extractant solution was 2:1. The molybdenum was extracted quantitatively into the organic phase which was separated from the aqueous phase. The organic solution of molybdenum values was stripped by contacting it with an aqueous solution which was 3 N with respect to both ammonia and ammonium chloride. The ratio of stripping solution to organic extractant solution was 1:2. The aqueous stripping solution was found to contain 97% of the molybdenum initially present in the organic extractant solution.

The organic extractant solution was shown to be recyclable by contacting it with a second portion of filtrate from the hydrogen peroxide digestion of a sample of molybdenum-containing stillbottom residues, again in a ratio of 2 volumes of aqueous filtrate solution to one of organic extractant solution. The extraction of molybdenum values into the reused organic extractant solution was found to be virtually quantitative.

In both the first cycle of extraction and the second cycle, transfer of molybdenum values from the original aqueous filtrate solution to the organic extractant solution was found to be essentially quantitative; transfer of molybdenum values from the organic extractant solution to the aqueous stripping solution was found to be 97% or better. The concentration of molybdenum in the original aqueous filtrate solution was about 31 g/l, while the final aqueous stripping solution contained about 118 g/l of molybdenum. This example thus illustrates the effective upgrading of the concentration of molybdenum values by liquid-liquid extraction, and the recyclability of the organic extractant solution.

EXAMPLE XIII

This example illustrates the concentration upgrading of the molybdenum-containing filtrate solution by solid-liquid extraction following the steps of digestion and filtration.

The filtrate from the hydrogen peroxide digestion and filtration of Example I, containing 9.5 g/l molybdenum, was passed through an ion exchange column comprised of an 8-hydroxyquinoline-ethylenediamine-resorcinol-formaldehyde (HERF) copolymer resin as described in U.S. Pat. No. 4,180,628 to Marchant et al. The extraction efficiency was initially 100%, but gradually dropped as the column became loaded with molybdenum. The input of filtrate solution to the column was stopped when the efficiency of extraction by the column had dropped to 81%. The column was then eluted with a solution 1 M with respect to both ammonia and ammonium chloride. The molybdenum was quantitatively eluted from the column. Combining the elution fractions which, in total, contained 95% of the molybdenum values produced a solution which had a molybdenum concentration of 52 g/l. This example thus illustrates the feasibility of incorporating into the process of this invention of a step of concentration upgrading of recovered molybdenum values by means of a liquid-solid extraction step.

Examples XIV-LX following, illustrate the embodiment of the invention in which viscous organic catalyst residues containing about 1-5 weight percent molybdenum are diluted with a solvent prior to removal of the molybdenum values.

EXAMPLE XIV

A sample of viscous still bottom residues weighing 53 g and containing 1.6 weight percent molybdenum was mixed with 53 ml of n-butyl acetate. This mixture was then contacted with 53 ml of a 2.86 weight percent (2 volume percent) aqueous solution of hydrogen peroxide for one hour. The resulting slurry was allowed to settle for two hours after which time the aqueous solution was analyzed for molybdenum content and found to contain 84.3 weight percent of the molybdenum initially present in the still bottom residues.

A second treatment of the diluted residues with a fresh 53 ml portion of 2.86 weight percent hydrogen peroxide brought the molybdenum concentration in the organic phase to a value of less than 110 ppm.

EXAMPLES XV-XX

Examples XV-XX demonstrate the effect of varying the solvent employed to dilute the still bottom residues upon the efficiency of recovery of molybdenum. The experimental conditions in each case were identical to those employed in Example XIV with the exception of the nature of diluting solvent employed. The results appear in Table 3 and illustrate that the best results were obtained when n-butyl acetate was used as diluent.

EXAMPLES XXI-XXXIII

Examples XXI-XXXIII demonstrate the effect upon efficiency of molybdenum recovery of variation in both the volume and strength of dilute aqueous hydrogen peroxide employed in treatment of diluted molybdenum containing catalyst residues. In each example the diluting organic solvent employed was n-butyl acetate. The conditions of each example were the same as those of Example XIV except for variation in the strength and volume of hydrogen peroxide empolyed; these values for each example are given in Table 4, following.

TABLE 3

| EXAMPLE | SOLVENT | MOLYBDENUM RECOVERED IN AQUEOUS PHASE AFTER 1 TREATMENT WITH $H_2O_2$ % | MOLYBDENUM IN ORGANIC PHASE AFTER 2 TREATMENTS WITH $H_2O_2$ ppm |
|---|---|---|---|
| XV | SC #150 | 73.4 | 480 |
| XVI | n-Butyl acetate | 84.3 | 110 |
| XVII | 2-Octanone | 84.3 | 300 |
| XVIII | Decyl alcohol | 77.9 | 240 |
| XIX | 1:1 Decyl alcohol:SC #150 | 78.5 | 380 |
| XX | 3:2 Decyl alcohol:kerosene | 78.4 | 320 |

TABLE 4

| EXAMPLE | RATIO OF VOLUME OF n-BUTYL ACETATE TO WEIGHT OF STILL BOTTOM RESIDUE (ml/g) | HYDROGEN PEROXIDE CONCENTRATION w/o | HYDROGEN PEROXIDE CONCENTRATION (v/o) | MOLYBDENUM RECOVERED IN AQUEOUS PHASE AFTER 1 CYCLE (%) | MOLYBDENUM CONCENTRATION IN ORGANIC PHASE AFTER 2 CYCLES (ppm) |
|---|---|---|---|---|---|
| XXI | 1:1 | 2.86 | (2) | 84.7 | 240 |
| XXII | 1:2 | 2.86 | (2) | 91.6 | 360 |
| XXIII | 1:4 | 2.86 | (2) | 83.8 | 450 |
| XXIV | 1:4 | 1.44 | (1) | 69.8 | — |
| XXV | 1:4 | 2.86 | (2) | 85.9 | 490 |
| XXVI | 1:4 | 4.32 | (3) | 90.9 | 290 |
| XXVII | 1:4 | 5.77 | (4) | 91.5 | 220 |
| XXVIII | 1:4 | 7.21 | (5) | 91.6 | 120 |
| XXIX | 1:2 | 1.44 | (1) | 68.0 | 810 |
| XXX | 1:2 | 2.86 | (2) | 78.4 | 400 |
| XXXI | 1:2 | 4.32 | (3) | 82.5 | 260 |
| XXXII | 1:2 | 5.77 | (4) | 83.3 | 200 |
| XXXIII | 1:2 | 7.21 | (5) | 74.0 | 85 |

EXAMPLES XXXIV-XL

Examples XXXIV-XL demonstrate that the aqueous oxidant solution used to recover molybdenum from a still bottom residue solution can be effectively recycled from the treatment of one batch of organic residues to the treatment of an additional batch of residues.

In Examples XXXIV-XXXVII, as shown in Table 5, batches of organic residues diluted with n-butyl acetate were treated with hydrogen peroxide solution. After one such treatment, as indicated by the data in column 5A, about 72-87% of the molybdenum was transferred to the aqueous phase. A second treatment of the organic residue solution with a fresh portion of peroxide extracted an additional amount of from between 8.9% to 13.1% of the molybdenum. Thus in Example XXXV, a total of 80.84% (Column 5A+Column 5B) of the molybdenum was transferred from the organic solution by two successive treatments of the organic residues solution with fresh portions of peroxide.

In Example XXXIX, treatment of a batch of organic residues solution with hydrogen peroxide which had already been employed in a second treatment of an earlier batch effected the recovery of 81.1% of the molybdenum.

The data of Table 5 thus indicate that the aqueous oxidant solution employed in a second or successive step treatment of residue batches may be effectively recycled to contact new batches of residue solutions without diminution of the recovery efficiency of the process.

TABLE 5

| 1 | 2 | | 3 | 4 | 5 MOLYBDENUM RECOVERED IN AQUEOUS PHASE | | | | 6 MOLYBDENUM IN ORGANIC PHASE AFTER 2 TREATMENTS WITH $H_2O_2$ |
|---|---|---|---|---|---|---|---|---|---|
| | HYDROGEN PEROXIDE CONCENTRATION | | | RATION OF PEROXIDE VOLUME TO ORGANIC RESIDUES VOLUME | A FIRST TREATMENT w/$H_2O_2$ | | B SECOND TREATMENT w/$H_2O_2$ | | |
| EXAMPLE | w/o | (v/o) | HYDROGEN PEROXIDE SOURCE | | % | g/l | % | g/l | ppm |
| XXXIV | 4.32 | (3) | Fresh solution | 1:1 | 84.3 | 10.0 | 9.27 | 1.1 | 280 |
| XXXV | 8.64 | (6) | Fresh solution | 1:2 | 71.9 | 19.3 | 8.94 | 2.4 | 270 |
| XXXVI | 12.98 | (9) | Fresh solution | 1:3 | 87.4 | 28.7 | 12.18 | 4.0 | 190 |
| XXXVII | 17.31 | (12) | Fresh solution | 1:4 | 86.9 | 37.2 | 13.08 | 5.6 | 270 |
| XXXVIII | 4.32 | (3) | Recycled aqueous layer from Ex. XXXIV | 1:1 | 83.7 | 11.0 | — | — | — |
| XXXIX | 8.64 | (6) | Recycled aqueous layer from Ex. XXXV | 1:2 | 81.1 | 21.1 | — | — | — |
| XL | 12.98 | (9) | Recycled aqueous layer from Ex. XXXVI | 1:3 | 77.6 | 31.3 | — | — | — |

EXAMPLE XLI

This example illustrates the isolation of molybdenum values from an aqueous oxidant solution by liquid-liquid extraction with a tertiary amine extractant solution.

A dilute $H_2O_2$ process stream containing about 6 g/l of molybdenum was extracted with a solution of Alamine 336 in SC #150 solvent. The volume ratio of organic extractant solution to aqueous peroxide solution was about 1:5 with the amount of Alamine 336 present in the extractant roughly 5 times the molar concentration of molybdenum in the aqueous solution.

The two solutions were vigorously mixed for about one hour and then allowed to settle for one hour. The transfer of molybdenum values into the organic phase was found to be essentially quantitative. The loaded organic phase was then extracted with an aqueous solution of 3 M ammonium hydroxide. The volume ratio of organic to aqueous solution was about 2:1. The transfer of molybdenum values from the organic phase to the aqueous phase was again found to be essentially quantitative, resulting in an aqueous solution containing about 56.5 g/l of molybdenum. Thus, liquid-liquid extraction of the initial peroxide solution of molybdenum resulted in an increase in the concentration by a factor of about 9.

The organic Alamine 336 extractant solution was found to be recyclable without any impairment of extraction efficiency.

Examples XLII–XLVIII following illustrate the use of sodium hypochlorite solution to recover molybdenum values from diluted organic catalyst residues which comprise 1–5 weight percent molybdenum.

EXAMPLE XLII

A batch of spent organic catalyst residues weighing 20.0 g and containing 1.6 w/o molybdenum was diluted with 45 ml of xylene. The resulting diluted solution was treated with 45 ml of 5 weight percent sodium hypochlorite solution for 30 minutes. After settling, the aqueous phase was separated and analyzed for molybdenum content and found to contain 70% of the molybdenum initially present in the residues mixture. A second treatment of this organic material with a fresh batch of 5 weight percent sodium hypochlorite solution transferred essentially all of the remaining molybdenum to the aqueous phase.

The aqueous solutions from both treatments were combined and treated to remove organic contaminants by passage through an activated charcoal column. The water clear solution was evaporated. Sodium chloride, which crystallized first from the evaporate was removed by filtration. Further evaporation yielded relatively pure $Na_2MoO_4.2H_2O$ which was identified by x-ray powder diffraction techniques.

EXAMPLES XLIII–LIX

Examples XLIII–LIX demonstrate the effect upon molybdenum recovery of variation in choice of solvent employed in dilution of the spent catalyst residues and variation in dilution ratio. In addition, the data, which appear in Table 6, also illustrate the effect upon recovery efficiency of variation in the ratio of aqueous oxidant solution to diluted spent catalyst mixture.

In each example, a sample of viscous catalyst residues was diluted with an organic solvent to obtain a free flowing liquid. The solvent used and the dilution ratio in milliliters of solvent per gram of catalyst residues is indicated in Table 6.

Following dilution, each sample was treated for 30 minutes with a 5 weight percent solution of aqueous sodium hypochlorite solution. The resulting slurry in each case was allowed to settle for one hour and the aqueous phase was separated and analyzed for molybdenum content. The organic layer was then subjected to a second treatment with a fresh portion of 5 weight percent aqueous sodium hypochlorite solution and after settling and separation of the aqueous phase, the organic phase was analyzed to determine the molybdenum remaining. The data for these analyses appear in Table 6.

The data indicate a greater effect of the ratio of oxidant to residues than that caused by change in solvent. Best results are obtained when the spent catalyst residues are more dilute and when a larger ratio of oxidant solution to diluted catalyst residues is employed.

TABLE 6

| EXAMPLE | SOLVENT | RATIO OF SOLVENT VOLUME TO CATALYST RESIDUE ml/g | RATIO OF OXIDANT VOLUME TO CATALYST RESIDUE (ml/g) | MOLYBDENUM RECOVERED IN AQUEOUS PHASE AFTER 1 TREATMENT WITH OXIDANT % | MOLYBDENUM REMAINING IN ORGANIC PHASE AFTER 2 TREATMENTS WITH OXIDANT ppm |
|---|---|---|---|---|---|
| XLIII | Xylene | 1:2 | 1.5:1 | 70.0 | 60 |
| XLIV | n-Butyl acetate | 1:2 | 1.5:1 | 75.0 | 73 |
| XLV | SC #150 | 1:2 | 1.5:1 | 74.0 | 88 |
| XLVI | 9:1 Xylene:decanol | 1:2 | 4:3 | 72.4 | 230 |
| XLVII | 8:2 Xylene:decanol | 1:2 | 4:3 | 72.9 | 165 |
| XLVIII | 7:3 Xylene:decanol | 1:2 | 4:3 | 69.5 | 190 |
| IL | 8:2 SC #150:decanol | 1:2 | 4:3 | 65.6 | 235 |
| L | 7:3 SC #150:decanol | 1:2 | 4:3 | 65.6 | 290 |
| LI | n-Butyl acetate | 1:2 | 4:3 | 85.0 | 200 |
| LII | n-Butyl acetate | 1:4 | 2:1 | 90.0 | 300 |
| LIII | Xylene | 1:4 | 2:1 | 80.0 | 290 |
| LIV | SC #150 | 1:4 | 2:1 | 54.7 | 800 |
| LV | Decanol | 1:4 | 2:1 | 51.2 | 3800 |
| LVI | n-Butyl acetate | 1:4 | 1.5:1 | 64.0 | 245 |
| LVII | Xylene | 1:4 | 1.5:1 | 54.4 | 340 |
| LVIII | 1:1 Xylene:2-octanol | 1:4 | 1.5:1 | 70.8 | 315 |
| LIX | 8:2 Xylene:2-octanol | 1:4 | 1.5:1 | 60.0 | 550 |

EXAMPLE LX

Example LX illustrates the isolation of molybdenum values from the sodium hypochlorite treatment solution by means of liquid-liquid extraction with a quaternary alkylammonium salt extractant solution.

A 200 ml organic-free solution containing about 2.6 g/l of molybdenum and having a pH of 7 was contacted with a solution of Aliquat 336 dissolved in SC #150 solvent. The ratio of volumes of organic extractant solution to aqueous solution was 1:8 and the molar ratio of Aliquat 336 to molybdenum was roughly 5:1.

The two solutions where shaken together for 30 minutes and then allowed to separate for one hour. The organic phase was separated and analyzed for molybdenum content and found to contain greater than 95% of the molybdenum originally present in the organic residues mixture.

The organic layer was next contacted with a 3 M solution of sodium hydroxide in a volume ratio of 1 part aqueous solution to 2 parts organic solution. The aqueous phase was separated and analyzed for molybdenum content. It was found to contain 38.5 g/l of molybdenum, representing roughly a 15-fold increase in molybdenum concentration as a result of the liquid-liquid extraction.

Examples LXI–LXIX illustrate the use of nitric acid at various concentrations as the oxidizing agent in the method of this invention.

EXAMPLE LXI

A sample of 50.0 g of semi-solid organic catalyst residue containing 11.2 weight percent (5.6 g) of molybdenum was digested at 95° C. for two hours with 200 ml of concentrated (18 molar, 69 weight percent) nitric acid. The resulting mixture was cooled to room temperature and then mixed with 250 ml of solvent comprising 50—50 volume percent acetone and xylene.

The resulting slurry was filtered and the solid residue repeatedly washed with portions of 50—50 volume percent acetone-xylene solvent mixture. The washed filter residue was dried at 105° C. and analyzed for molybdenum content. The 11.8 g of filter residue were found to contain 46.9 weight percent (5.53 g) of molybdenum, representing a 98.8% recovery of the metal from the initial organic catalyst residue mixture.

The powder x-ray diffraction pattern of the molybdenum-containing product corresponded to that of molybdenum oxalate.

EXAMPLE LXII

A sample of 10.09 g of semi-solid organic catalyst residue containing 15.5 weight percent (1.56 g) of molybdenum was digested at 95° C. for two hours with 40 ml of concentrated (18 molar, 69 weight percent) nitric acid. The resulting mixture was cooled to room temperature and filtered. The residue was taken up in 20 ml of 6 molar sodium hydroxide. The undissolved solids were removed by filtration, and the filter residue was repeatedly washed with portions of deionized water. The washings were combined with the filtrate for a total volume of 78.5 ml which was found to contain 19.95 g/l of molybdenum as sodium molybdate. This represented a recovery of 1.56 g or virtually 100% of the molybdenum initially present in the catalyst residue.

EXAMPLES LXIV–LXIX

These Examples illustrate the effect of varying the strength of nitric acid upon the efficiency of recovery of molybdenum from spent epoxidation catalyst mixtures. The experimental conditions in each Example were identical to those of Example LXI; only the nitric acid concentration was altered from one Example to the next. The results of these experiments appear in Table 7.

As can be seen by the data presented there, the efficiency of extraction does not rise much above 50% at nitric acid concentrations below about 5 molar (27 weight percent). This is attributable to the decreased oxidizing power of dilute aqueous nitric acid solutions. Higher concentrations of nitric acid are preferred, generally above about 5 molar, because of their increased capacity to oxidize the catalyst mixture.

TABLE 7

| EXAMPLE | NITRIC ACID CONCENTRATION (MOLES/LITER) | PERCENT RECOVERY OF MOLYBDENUM AFTER 1 OXIDIZING STEP |
|---|---|---|
| LXIV | 1 | 3.3 |
| LXV | 2 | 8.7 |
| LXVI | 3 | 44.0 |
| LXVII | 4 | 52.0 |
| LXVIII | 5 | 72.0 |
| LXIX | 6 | 76.0 |

EXAMPLE LXX

A sample of the viscous liquid catalyst residue derived from the process of epoxidation of olefins by organic hydroperoxides was analyzed by electron spin resonance (ESR) spectroscopy to determine the oxidation state of the molybdenum present in the mixture.

The X-band ESR spectrum was obtained at 9.45 gHz using a radio frequency of 100 kHz operated at a power level of 38 mW. The spectrum showed a strong single resonance line with both a g value (g=2.0760) and a line shape characteristic of the $Mo^{5+}$ oxidation state [see M. I. Scullane, et al., "Electron Paramagnetic Resonance Structural Studies of Molybdenum (V)-Oxo Complexes," *J. Inorg. Chem.*, 18 : 3213–3219 (1979)].

While there have been shown and described what are at present believed to be the preferred embodiments of the invention, it will be obvious to those skilled in the art that various changes and modifications may be made therein without departing from the scope of the invention as defined by the appended claims.

What is claimed is:

1. The method of recovering water insoluble organically-bound molybdenum from spent viscous fluid organic catalyst residues derived from the epoxidation of olefins, wherein a portion of said organically-bound molybdenum is in the 5+ oxidation state, and wherein said viscous fluid residues contain less than 5 weight percent molybdenum, said method comprising the steps of:
   (a) contacting said viscous fluid residues with an aqueous solution containing up to 20 weight percent of a material selected from the group consisting of hydrogen peroxide, sodium peroxide, sodium hypochlorite, chlorine, and ozone for a period sufficient to oxidize a portion of said molybdenum to a higher oxidation state water soluble form and to transfer a portion of said molybdenum to a higher oxidation state water soluble form and to transfer a portion of said water soluble molybdenum to said aqueous solution;
   (b) separating said aqueous solution containing said water soluble molybdenum; and
   (c) thereafter isolating the molybdenum from said aqueous solution.

2. The method in accordance with claim 1 wherein step (c) of isolating the molybdenum from said aqueous solution includes concentrating the molybdenum in said aqueous solution by a plurality of liquid-liquid extraction cycles, each of said extraction cycles comprising contacting said aqueous solution containing molybdenum with an organic extractant solution including a tertiary alkylamine or a quaternary alkylammonium salt to extract a portion of the molybdenum into said organic extractant solution, and thereafter contacting said organic extractant solution containing molybdenum with an aqueous stripping solution containing ammonium hydroxide or ammonium chloride to strip the molybdenum into said aqueous stripping solution.

3. The method in accordance with claim 2 wherein said tertiary alkylamine comprises tricaprylylamine.

4. The method in accordance with claim 2 wherein said quaternary alkylammonium salt comprises methyl tricaprylylammonium chloride.

5. The method in accordance with claim 1 wherein step (c) of isolating the molybdenum from said aqueous solution includes concentrating the molybdenum in said aqueous solution by liquid-solid extraction comprising sorption of the molybdenum on an ion exchange resin and thereafter desorbing said molybdenum from said resin in a concentrated form in an aqueous eluant.

6. The method in accordance with claim 5 wherein said ion exchange resin comprises a copolymer of 8-hydroxyquinoline, ethylenediamine, resorcinol, and formaldehyde.

7. The method in accordance with claim 5 wherein said aqueous eluant is selected from the group consisting of ammonium hydroxide, ammonium chloride, and mixtures thereof.

8. The method in accordance with claim 1 further including the step of diluting said viscous fluid catalyst residue with an organic solvent prior to the step of contacting with an aqueous solution of an oxidizing agent.

9. The method in accordance with claim 8 wherein said organic solvent is selected from the group consisting of toluene, xylene, kerosene, #2 diesel fuel, SC #150, 2-octanol, decanol, 2-octanone, n-butyl acetate, and mixtures thereof.

10. The method in accordance with claim 8 wherein said step of diluting comprises mixing said organic solvent with said fluid catalyst residue in a ratio of between about 1 liter of solvent per kilogram of catalyst residue to about 4 liters of solvent per kilogram of catalyst residue.

11. The method of recovering water-insoluble organically-bound molybdenum from the semi-solid residue derived from the evaporative or distillative concentration of catalyst residues from the process of epoxidation of olefins, wherein a portion of said organically bound molybdenum is in the 5+ oxidation state, and wherein said semi-solid residue contains at least 5 weight percent molybdenum, said method comprising the steps of:
(a) contacting said semi-solid residue with an aqueous solution of an oxidizing agent containing up to 20 weight percent of a material selected from the group consisting of hydrogen peroxide, sodium peroxide, sodium hypochlorite, chlorine, and ozone, or at least 20 weight percent of nitric acid for a period of time sufficient to oxidize a portion of the organically-bound molybdenum to a higher oxidation state water soluble form and to transfer a portion of the water soluble molybdenum to the aqueous solution;
(b) separating the aqueous solution containing the molybdenum;
(c) filtering the aqueous solution containing the molybdenum to remove suspended solids;
(d) adjusting the pH of the filtered molybdenum containing aqueous solution to a value above pH 6;
(e) contacting the pH-adjusted aqueous solution with an active carbon sorbent to remove organic contaminants remaining in said aqueous solution; and
(f) isolating the molybdenum from the organic-free pH-adjusted aqueous solution.

12. The method in accordance with claim 11 wherein said aqueous solution of an oxidizing agent consists essentially of about 13.8 weight percent (10 volume percent) hydrogen peroxide.

13. The method in accordance with claim 11 wherein said aqueous solution of an oxidizing agent consists essentially of at least 27 weight percent (5 molar) nitric acid.

14. The method in accordance with claim 11 further including the step of concentrating the molybdenum contained in said organic-free pH-adjusted aqueous solution derived from step (e), said step of concentrating comprising:
(1) contacting said aqueous solution containing molybdenum with an organic solvent containing a tertiary alkylamine or a quaternary alkylammonium salt to transfer a portion of the molybdenum from the aqueous solution to the organic solvent;
(2) separating the organic solvent containing the molybdenum;
(3) contacting the molybdenum-containing organic solvent with an aqueous stripping solution containing ammonium hydroxide or ammonium chloride to transfer a portion of the molybdenum from the organic solvent to the aqueous stripping solution; and
(4) thereafter isolating the molybdenum from said aqueous stripping solution.

15. The method in accordance with claim 14 wherein said tertiary alkylamine comprises tricaprylylamine.

16. The method in accordance with claim 14 wherein said quaternary alkylammonium salt comprises methyl tricaprylylammonium chloride.

17. The method in accordance with claim 11 further including the step of concentrating the molybdenum contained in the organic-free, pH-adjusted aqueous solution derived from step (e), said step of concentrating comprising contacting said aqueous solution containing molybdenum with an ion exchange resin to sorb the molybdenum on said resin and thereafter contacting said molybdenum-loaded resin with an aqueous eluant solution to desorb said molybdenum from said resin.

18. The method in accordance with claim 17 wherein said ion exchange resin comprises a copolymer of 8-hydroxyquinoline, ethylenediamine, resorcinol, and formaldehyde.

19. The method of recovering organically-bound water-insoluble molybdenum from the viscous fluid catalyst residue derived from the process of epoxidation of olefins, wherein a portion of said organically-bound molybdenum is in the 5+ oxidation state and wherein said viscous fluid catalyst residue contains less than 5 weight percent molybdenum, the method comprising the steps of:
(a) diluting said viscous fluid catalyst residue with an organic solvent in a ratio between 1 liter per kilogram of catalyst residue to 4 liters of solvent per kilogram of catalyst residue;
(b) contacting said diluted catalyst residue solution with an aqueous solution of an oxidizing agent containing up to 20 weight percent of a material selected from the group consisting of hydrogen peroxide, sodium peroxide, sodium hypochlorite, chlorine, and ozone, or at least 20 weight percent nitric acid sequentially in a plurality of reactors, to oxidize a portion of said molybdenum to a higher oxidation state water soluble form and to transfer a portion of the water soluble molybdenum from the diluted organic solution to the aqueous solution;

(c) separating the molybdenum-containing aqueous solution from said diluted organic solution;

(d) contacting said molybdenum-containing aqueous solution with an active carbon sorbent to remove organic contaminants remaining in said molybdenum-containing aqueous solution; and (e) isolating the molybdenum from the organic-free aqueous solution.

20. The method in accordance with claim 19 wherein said aqueous solution of an oxidizing agent is recycled from the second and successive reactors in said plurality of reactors to contact said diluted organic solution of catalyst residue in preceding reactors in said plurality of reactors.

21. The method in accordance with claim 19 further including the step of concentrating the molybdenum contained in the aqueous solution derived from step (d) by subjecting said aqueous solution to a plurality of liquid-liquid extraction steps, each of said extraction steps comprising contacting said aqueous solution with an organic solvent containing tricaprylylamine or methyl tricaprylylammonium chloride to transfer a portion of the molybdenum from said aqueous solution to said organic solvent, separating the molybdenum-containing organic solution, and thereafter contacting said molybdenum-containing organic solution with an aqueous stripping solution containing ammonium hydroxide or ammonium chloride to transfer a portion of the molybdenum from said organic solution to said aqueous stripping solution.

22. The method in accordance with claim 19 wherein said organic solvent is selected from the group consisting of toluene, xylene, kerosene, SC #150, 2-octanol, decanol, 2-octanone, n-butyl acetate, and mixtures thereof.

23. The method in accordance with claim 19 further including the step of concentrating the molybdenum contained in the organic-free aqueous solution derived from step (d), said step of concentrating comprising contacting said organic-free aqueous solution containing molybdenum with an ion exchange resin comprising a copolymer of 8-hydroxyquinoline, ethylenediamine, resorcinol, and formaldehyde to sorb a portion of the molybdenum on said resin, and thereafter desorbing said molybdenum from said resin with an aqueous eluant containing ammonium hydroxide or ammonium chloride.

24. The method in accordance with claim 19 further including the step of combusting the molybdenum-free diluted organic catalyst residue solution derived from step (c).

* * * * *